June 4, 1957
C. SCHWARTZ
2,794,746
METHOD AND APPARATUS FOR MAKING CHEESE
Filed June 10, 1955
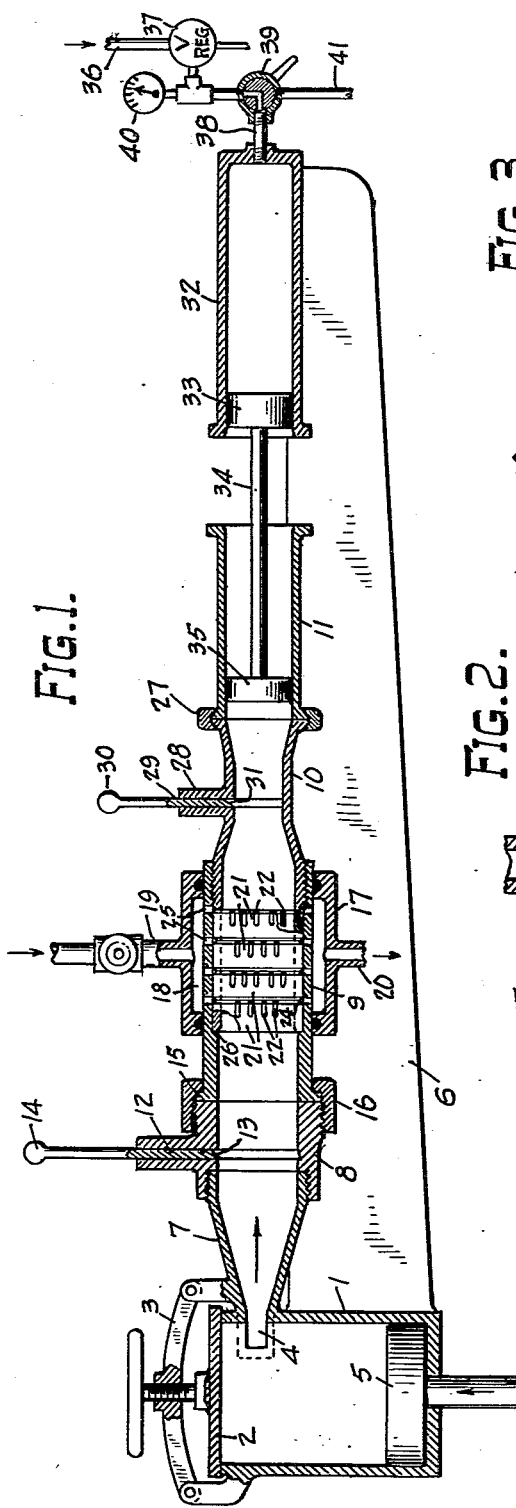
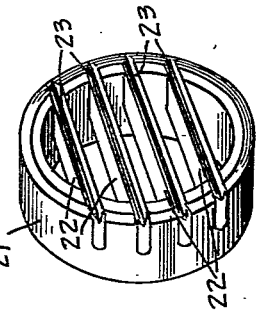
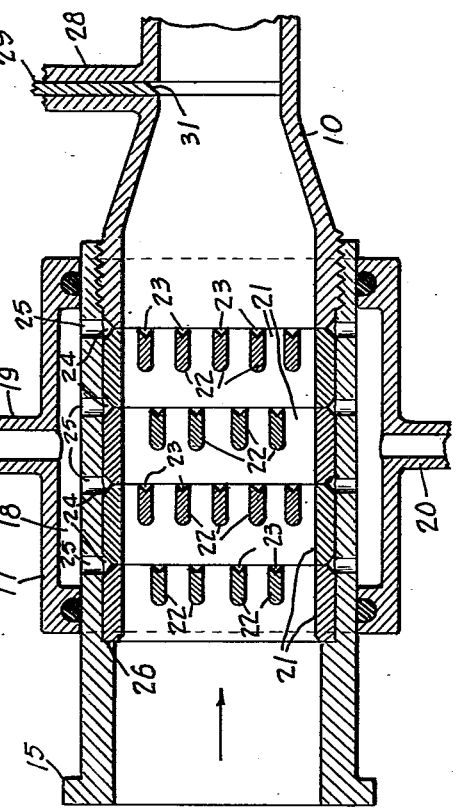
INVENTOR.
Carl Schwartz
BY
Andrus & Sceales
Attorneys

United States Patent Office 2,794,746
Patented June 4, 1957

2,794,746

METHOD AND APPARATUS FOR MAKING CHEESE

Carl Schwartz, Elkhart Lake, Wis.; Henry Schwartz, special administrator of the estate of said Schwartz, deceased, assignor to Cheese Machinery, Inc., Sheboygan, Wis., a corporation of Wisconsin Application June 10, 1955, Serial No. 514,515

10 Claims. (Cl. 99—115)

This invention relates to apparatus and a method for making cheese and particularly has reference to the making of various types of Italian and American cheese.

In the manufacture of Parmesan cheese, for example, it is necessary during the course of the manufacture of the cheese that the cheese be stretched in order to give body, texture and elasticity to the cheese. Under prior practices, after the curd is formed the cheese is placed in a machine where it is revolved to form the cheese into a mass. Thereafter the cheese is pulled manually over an apparatus of trapeze-like form whereby the cheese is separated and stretched into elongated portions. The cheese is then manually dipped in warm water and kneaded by hand to unite the stretched portions and solidify the cheese into a mass. The warm water permits ready kneading and solidifying of the cheese and the operator is able by the kneading to eliminate air pockets in the cheese and to give it the desired texture and body. The manual operations described are unsanitary and time consuming.

The invention is directed to apparatus and method whereby the stretching, separating and kneading can be accomplished without the manual operations described and the cheese prepared with an improved body and texture and the elasticity desired.

An embodiment of the invention as shown in the accompanying drawing illustrates the apparatus which is employed to accomplish the method of the invention.

In the drawing:

Figure 1 is a longitudinal sectional view of the apparatus of the invention;

Fig. 2 is an enlarged sectional view of the means for stretching the cheese while adding hot water to it; and Fig. 3 is a perspective view of one of the stretching rings of the invention.

Referring to the drawing there is shown a generally large diameter stuffer cylinder 1 within which the cheese to be processed is disposed. The cylinder 1 is closed at the top by a removable cover 2 which is secured to the upper end of the cylinder by the bail 3. The cheese is expressed from cylinder 1 through opening 4 and into the cheese processing apparatus by a piston 5 which is operated by pneumatic means, not shown, to move upwardly from the bottom of the cylinder into engagement with the cheese to express it as described.

The term "cheese" as used herein refers to the cheese as it is formed and molded in the processing apparatus as well as the curd which is loaded into the stuffer cylinder.

The cheese processing apparatus may be supported from cylinder 1 by a longitudinally extending base 6 secured to cylinder 1, and such apparatus comprises a number of parts through which the cheese passes and means for maintaining the cheese under a constant pressure.

The cheese processing apparatus in general comprises the tube 7, a valve tube 8, a stretching section 9, a spacer tube 10 and a mold 11.

Tube 7 is of cone shape and is suitably secured to the upper end portion of the side wall of cylinder 1 in line with opening 4. The valve tube 8 is threaded onto tube 7 and carries a gate valve 12 generally centrally thereof. Valve 12 is a metal plate having a cutting edge 13 and may be moved up and down inside of tube 8 by means of handle 14 located outside of tube 8. When it is desired to separate the cheese within tube 8, valve 12 is lowered within the tube. This permits disassembly of the parts of the apparatus to the right of valve 8 as seen in Figure 1.

The inner end of the generally cylindrical cheese stretching section 9 has a flange 15 and is secured to the outer end of valve tube 8 by the flanged ring 16, the flange of ring 16 engaging flange 15 on the end of valve tube 8 and the ring being internally threaded for threading the ring onto the threaded end of tube 8.

A manifold 17 encircles tube section 9 and provides a closed header chamber 18 around tube section 9 to receive hot water from the hot water connection 19 which is secured to the upper part of the manifold 17. The water received by the manifold 17 has a temperature of from 140° to 170° F. and is under city pressure. The water drains from chamber 18 by gravity flow through drain 20 at the bottom of manifold 17. The use of the hot water and its flow path will be described hereinafter.

To accomplish the stretching of the cheese and insertion of hot water therein the inside of tube section 9 is provided with a plurality of cutter rings 21, the first of such rings being illustrated in perspective by Fig. 3. Eight cutter rings are usually assembled together but only four rings are shown in Figs. 1 and 2 for purposes of illustration.

The rings 21 carry a plurality of spaced bars 22 on the face of each ring removed from the cylinder 1 and each bar has a groove 23 on the forward side of the bars removed from cylinder 1. In the illustration of the rings 21 in Figs. 1 and 2 the first and third rings have four bars 22 and the second and fourth rings have five bars each. The bars may be varied in each ring but it has been found that the distribution of bars 22, as described, effectively separates and stretches the cheese into elongated portions as the cheese is forced through tube section 9. The rings other than the first ring 21 which is only tapered on the outer end are tapered on each end to provide a circumferential passage 24 between each ring which connects the grooves 23 and the openings 25 in the upper portion of tube section 9 which lead to chamber 18 of the manifold 17.

The first ring 21 to the left as seen in Fig. 2 rests against the abutment 26 on the inside of tube section 9. The second ring from the left in Fig. 2 abuts the first ring to provide the first hot water passage or groove 24 around the rings in line with the first opening 25. The third ring from the left in Fig. 2 abuts the second ring to provide a second circumferential passage 24 that connects with the second opening 25. The fourth ring from the left in Fig. 2 abuts the third ring and the meeting tapered ends of the rings provide a third circumferential passage 24 that connects with the third opening 25. The outer end of the fourth ring is engaged by the tubular spacer 10 which tapers at its inner end and cooperates with the tapered end of the fourth ring 21 to provide a fourth circumferential passage 24 that connects with a fourth opening 25 into the manifold chamber 18. The spacer tube 10 is threaded into the outer end of tube section 9 and against the outermost ring 21 to hold the rings in place.

The rings 21 may be greater in number than those shown depending upon the type of cheese handled or the process desired to be carried out and likewise bars 22 on the rings as previously stated may also be increased or decreased in number. However, it is necessary that the bars be arranged so that the greatest area of cheese possible is passed over them. Thus, in the drawing illustrating the invention looking from the left in Fig. 2, the bars of the first and third rings are shown as in line while the bars of the second and fourth rings are in line with each other and offset from the bars of the first and third rings.

Thus, when cylinder 1 is loaded with cheese and piston 5 is actuated, the cheese is expressed or forced past bars 22 under pressure of at least sixty pounds, depending on the speed of expressing desired, and the cheese is separated and stretched by the bars to eliminate voids in the cheese. As the cheese passes over the bars the hot water circulating in grooves 23 and circumferential passages 24 from chamber 18 of manifold 17 by way of openings 25 is drawn into the cheese by the vacuum created as the cheese is forced past the bars 22 and separated thereby. The hot water effects the uniting and solidifying of the cheese after it has been separated and stretched. Some of the hot water drains from the cheese and flows back into the manifold chamber through the second series of openings 25 shown in Fig. 2 in the bottom of tube section 9 and then drains off through drain 20.

The cheese passes from the bars 22 through spacer tube 10 into the mold 11 which is shown herein for purposes of illustration as being of oblong cylindrical shape. Mold 11 is secured to tube 10 by split clamp 27 which fits over matching flanges on spacer 10 and mold 11. The spacer tube 10 is restricted centrally to squeeze substantially all the hot water from the cheese and the water flows back from tube 10 and out through lower openings 25 and drain 20. An abutment 28 is provided on the outside of spacer tube 10 and has a central opening to receive the cutting plate valve 29 which is moved vertically downwardly through an aligned opening in the wall of spacer 10 by means of handle 30 to separate the cheese in spacer 10 from the cheese extruded into mold 11, when it is desired to remove the mold and cheese from the apparatus. The lower end of plate 29 is provided with a knife edge 31 in order to easily cut the cheese.

Mold 11 is shown in Fig. 1 as being generally cylindrical and is disposed in alignment with air cylinder 32 which is secured to base 6. The piston 33 operates in cylinder 32 and carries a rod 34 which extends into mold 11 and supports a head 35 therein to maintain a constant pressure on the cheese of lesser amount than the extrusion pressure as the cheese is extruded into the mold from tube section 9. The pressure usually is maintained at from four to thirty pounds. Head 35 is concave on its face and is threaded onto the end of rod 34, the threaded engagement with rod 34 enabling different size heads to be employed with different size molds 11.

The piston is operated by air supplied through tube 36 from a source, not shown. Tube 36 is connected to a pressure regulator 37 which in turn is connected to cylinder 32 by a line 38 to which is connected the valve 39 and the pressure gauge 40. The regulator may be set to indicate a pressure on gauge 40 of from four to thirty pounds and valve 39 when opened permits the air to pass to cylinder 32 from regulator 37 and maintain piston 33 under a constant predetermined pressure. In initially locating head 35 the piston 33 is actuated to locate the head to the cheese entry side of the mold. Then the air pressure maintained on piston 33 effects movement of head 35 forwardly of mold 11 under the extrusion pressure on the cheese as it is forced into mold 11, the extrusion pressure being greater than the pressure exerted on piston 33. The pressure exerted on the cheese within the mold from both sides with less pressure on the forward side insures that the cheese will fill mold 11 without voids in the cheese.

After mold 11 is filled gate valve 12 is closed to shut off the forwardly directed pressure, valve 39 is then operated to close line 38 and open a passage for the air from cylinder 32 to flow back to its source through line 41. When valve 39 is operated to close line 38 piston 33 can be forced manually back into cylinder 32 to remove head 35 from mold 11. The cutting plate 29 is then forced downwardly to cut the cheese just rearwardly of mold 11. Split clamp 27 is thereafter released and mold 11 is removed with the molded cheese in it, the cheese being then readily removable from the mold.

Although the cheese shown is formed in an oblong round mold, the cheese can also be molded round under this invention or to other shapes and sizes that may be desired. More than one processing apparatus may also be connected to the stuffer cylinder. The invention has been found to retain the original fat content of the cheese as well as giving it an improved texture and consistency.

Various modes of carrying out the invention are contemplated as within the scope of the following claims particularly pointing out and distinctly claiming the subject matter which is regarded as the invention.

I claim:

1. A method of making cheese, which comprises forcing a previously prepared cheese curd forwardly under pressure, stretching the cheese curd while the cheese curd is confined by separating the cheese curd into elongated portions under the forwardly exerted pressure, inserting hot water into the cheese curd simultaneously upon the stretching and separating of the cheese curd to effect reuniting of the stretched and separated portions of cheese curd, removing the hot water from the stretched cheese curd, forcing the cheese curd into a mold under the forwardly exerted pressure to substantially fill the mold with cheese curd, and thereafter removing the cheese curd from the mold.

2. A method of making cheese, which comprises forcing a previously prepared cheese curd under a forwardly exerted pressure in a confined path, stretching the cheese curd in said confined path by separating the cheese curd into elongated portions, inserting hot water into the cheese curd simultaneously upon the stretching and separating of the cheese curd to effect reuniting of the stretched and separated portions of the cheese curd, removing the hot water from the stretched cheese curd, forcing the cheese curd into a mold under the forwardly exerted pressure while maintaining a rearwardly directed pressure on the cheese curd in the mold of lesser amount than said forwardly exerted pressure to substantially fill the mold with cheese curd, and thereafter removing the cheese curd from the mold.

3. A method of making cheese, which comprises forcing a previously prepared cheese curd under a pressure of at least sixty pounds in a forwardly moving confined path, stretching the cheese curd in said confined path by separating the cheese curd into elongated portions, inserting water of at least 140° F. into the cheese curd simultaneously upon the stretching and separating of the cheese curd to effect reuniting of the stretched and separated portions of the cheese curd, removing the hot water from the cheese curd by restricting the forward flow of said cheese curd, then forcing the cheese curd into a mold under the forwardly exerted pressure while maintaining a rearwardly directed pressure on the cheese curd in the mold of lesser amount than said forwardly exerted pressure to substantially fill the mold with cheese curd, separating the cheese curd in the mold from the preceding cheese curd, and thereafter removing the cheese from the mold.

4. Apparatus for making cheese, which comprises a stuffer cylinder for receiving the cheese curd to be operated upon, container means secured to the cylinder at an opening therein and extending longitudinally therefrom, pressure means associated with said cylinder to force cheese curd from the cylinder and through said container means, a plurality of longitudinally spaced and offset bars disposed across said container means in the path of flow of the cheese curd therein to separate and stretch the cheese curd into elongated separated portions, means to flow hot water into the separated and stretched portions of cheese curd to effect reuniting and solidifying of said cheese curd, means to force the hot water from the cheese curd after the elongated portions have been reunited, a mold member disposed adjacent said container means to receive the cheese curd from which the hot water has been removed, and means in said mold to insure filling of the mold with cheese curd without substantial voids under the pressure means forcing the cheese curd from the stuffer cylinder and through the container means.

5. Apparatus for making cheese, which comprises a stuffer cylinder for receiving the cheese curd to be operated upon, container means secured to the cylinder at an opening therein and extending longitudinally therefrom, pressure means associated with said cylinder to force cheese curd from the cylinder and through said container means, a plurality of longitudinally spaced and offset bars disposed across said container means in the path of flow of the cheese curd therein to separate and stretch the cheese curd into elongated separate portions, grooves extending along the side of said bars in the forward direction of flow of the cheese curd, a source of hot water connected to said container means to supply hot water to said grooves with said hot water entering said cheese curd after the same is separated by said bars, means to restrict the forward movement of the cheese curd from said bars to substantially remove the hot water therefrom, a mold member disposed adjacent said container means to receive the cheese curd from which the hot water has been removed, and means in said mold to insure filling of the mold with cheese curd without substantial voids under the pressure means forcing the cheese curd from the stuffer cylinder and through the container means.

6. Apparatus for making cheese, which comprises a stuffer cylinder for receiving the cheese curd to be operated upon, container means secured to the cylinder at an opening therein and extending longitudinally therefrom, pressure means associated with said cylinder to force cheese curd from the cylinder and through said container means, a plurality of longitudinally spaced and offset bars disposed across said container means in the path of flow of the cheese curd therein to separate and stretch the cheese into elongated separate portions, grooves extending along the side of said bars in the forward direction of flow of the cheese, a source of hot water connected to said container means to supply hot water to said grooves with said hot water entering said cheese curd after the same is separated by said bars, means to restrict the forward movement of the cheese curd from said bars to substantially remove the hot water therefrom, a mold member disposed adjacent said container means to receive the cheese curd from which the hot water has been removed, a head member disposed in said mold to engage said cheese curd as the cheese curd is forced into the mold, a piston secured to the head member, and means to maintain a constant pressure on the piston of lesser pressure than the pressure means forcing the cheese curd into the mold to effect gradual retraction of the head member and filling of the mold with cheese curd without any substantial voids.

7. Apparatus for making cheese, which comprises a stuffer cylinder for receiving the cheese curd to be operated upon, container means secured to the cylinder at an opening therein and extending longitudinally therefrom, pressure means associated with said cylinder to force cheese curd from the cylinder and through said container means, a plurality of longitudinally spaced and offset bars disposed across said container means in the path of flow of the cheese curd therein to separate and stretch the cheese curd into elongated separated portions, grooves extending along the side of said bars in the forward direction of flow of the cheese curd, a source of hot water connected to said container means to supply hot water to said grooves with said hot water entering said cheese curd after the same is separated by said bars, means to restrict the forward movement of the cheese curd from said bars to substantially remove the hot water therefrom, a mold member disposed adjacent said container means to receive the cheese curd from which the hot water has been removed, means in said mold to insure filling of the mold with cheese curd without substantial voids under the pressure means forcing the cheese curd from the stuffer cylinder and through the container means, and valve means disposed ahead of said mold and adapted to separate the cheese curd in the mold transversely from the cheese curd in said container means to provide for removal of the mold and the cheese curd therein.

8. Apparatus for making cheese, which comprises a stuffer cylinder for receiving the cheese curd to be operated upon, container means secured to the cylinder at an opening therein and extending longitudinally therefrom, a piston disposed in said cylinder and adapted to be actuated to express the cheese curd from the cylinder and through the container means under a substantial pressure, a plurality of rings located side by side inside the container means with the facing ends of each ring being tapered to provide a circumferential groove around each pair of rings, a plurality of bars extending transversely of each ring with every other ring having a greater number of bars than the preceding ring to dispose the bars in the assembled rings in offset relationship with respect to the bars of the next adjacent ring, grooves extending in the forward surface of said bars and connecting with said circumferential grooves, means connected to the container means to circulate hot water in said transverse and circumferential grooves to flow water into the cheese curd as the cheese curd is expressed over said bars, means to remove the hot water from the cheese curd after passing over the bars and to solidify said cheese curd, and a mold disposed in the path of movement of the cheese curd and being adapted to receive said cheese curd and mold the same to the shape desired after the cheese curd is solidified and the hot water removed.

9. Apparatus for making cheese, which comprises a stuffer cylinder for receiving the cheese curd to be operated upon, container means secured to the cylinder at an opening therein and extending longitudinally therefrom, a piston disposed in said cylinder and adapted to be actuated to express the cheese curd from the cylinder and through the container means under a substantial pressure, a plurality of rings located side by side inside the container means with the facing ends of each ring being tapered to provide a circumferential groove around each pair of rings, a plurality of bars extending transversely of each ring with every other ring having a greater number of bars than the preceding ring to dispose the bars in the assembled rings in offset relationship with respect to the bars of the next adjacent ring, grooves extending in the forward surface of said bars and connecting with said circumferential grooves, a manifold surrounding said container means at the location of said rings and providing a closed chamber around the container means, means connecting the closed chamber to the circumferential grooves around said rings, a hot water connection secured to the manifold to supply hot water to the manifold closed chamber and thence to the circumferential grooves and the grooves in said bars to flow water by vacuum into the cheese curd as the cheese curd is expressed over said bars, means to remove the hot water from the cheese curd, and a mold disposed in the path of movement of the cheese curd and being adapted to receive said cheese curd and mold the cheese curd to the shape desired after the cheese curd is solidified and the hot water removed.

10. Apparatus for making cheese, which comprises a stuffer cylinder for receiving the cheese curd to be operated upon, container means secured to the cylinder at an opening therein and extending longitudinally therefrom, pressure means associated with said cylinder to force cheese curd from the cylinder and through said container means, a plurality of longitudinally spaced and offset bars disposed across a portion of said container means in the path of flow of the cheese curd therein to separate and stretch the cheese curd into elongated separated portions, means to flow hot water into contact with the separated and stretched portions of cheese curd to effect reuniting and solidifying of the cheese curd after passing over said bars, means to force the hot water from the cheese curd after the elongated portions have been reunited, a mold adapted to receive the solidified cheese curd, a gate valve secured to the container means ahead of said mold and following the said bars with said valve being operable to separate the cheese curd in the mold from the preceding cheese, and a second gate valve secured to the container means ahead of the bars and removed from the stuffer cylinder with said valve being operable to separate the cheese curd in the cylinder from the cheese curd in the container means for disassembly of the parts.

References Cited in the file of this patent

UNITED STATES PATENTS

| | | |
|---|---|---|
| 1,492,388 | Popper | Apr. 29, 1924 |
| 1,965,618 | Vogt | July 10, 1934 |
| 2,206,419 | Miller | July 2, 1940 |
| 2,389,084 | Routh | Nov. 13, 1945 |
| 2,649,377 | Wilsmann | Aug. 18, 1953 |
| 2,669,946 | Peyton | Feb. 23, 1954 |
| 2,733,148 | Russo | Jan. 31, 1956 |

FOREIGN PATENTS

| | | |
|---|---|---|
| 13,832 | Netherlands | Feb. 15, 1926 |